US012658793B2

(12) United States Patent
Agarwal et al.

(10) Patent No.: US 12,658,793 B2
(45) Date of Patent: Jun. 16, 2026

(54) CIRCUITS AND METHODS FOR CONTROLLING EFFICIENCY OF A CHARGE-PUMP REGULATION SYSTEM AT LOW-LOAD CURRENT

(71) Applicant: Samsung Electronics Co., Ltd., Suwon-si (KR)

(72) Inventors: Piyush Agarwal, Bangalore (IN); Mukul Agarwal, Bangalore (IN); Marthanda Gnanendra Rao, Bangalore (IN); Subodh Prakash Taigor, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 18/973,645

(22) Filed: Dec. 9, 2024

(65) Prior Publication Data

US 2026/0100644 A1      Apr. 9, 2026

(30) Foreign Application Priority Data

Oct. 5, 2024      (IN) .............................. 202441075431

(51) Int. Cl.
*H02M 3/07* (2006.01)
*H02M 1/00* (2006.01)

(52) U.S. Cl.
CPC ........... *H02M 3/07* (2013.01); *H02M 1/0025* (2021.05); *H02M 1/0041* (2021.05)

(58) Field of Classification Search
CPC ..... H02M 1/0025; H02M 1/0041; H02M 3/07
USPC ........................................................ 327/536
See application file for complete search history.

(56) References Cited

U.S. PATENT DOCUMENTS

| | | | |
|---|---|---|---|
| 6,188,590 B1 | 2/2001 | Chang et al. | |
| 9,154,027 B2 | 10/2015 | Huynh et al. | |
| 11,489,443 B2 | 11/2022 | Xu | |
| 2002/0075063 A1 | 6/2002 | Hwang | |
| 2009/0225631 A1* | 9/2009 | Shimizu ................. | G04F 10/06 |
| | | | 368/113 |

* cited by examiner

*Primary Examiner* — William Hernandez
(74) *Attorney, Agent, or Firm* — Fish & Richardson P.C.

(57) ABSTRACT

The control circuit comprises an oscillator generating one or more clock pulse trains with variable clock periods, based on one or more load currents at the output end of the charge pump. The one or more clock pulse trains generated by the oscillator are trimmed based on output from a time-to-voltage converter and a comparator providing information on low load current. Power consumption by a dynamic comparator is reduced at low load current, wherein the dynamic comparator is triggered by the one or more clock pulse trains having variable clock periods.

11 Claims, 7 Drawing Sheets

FIG. 5

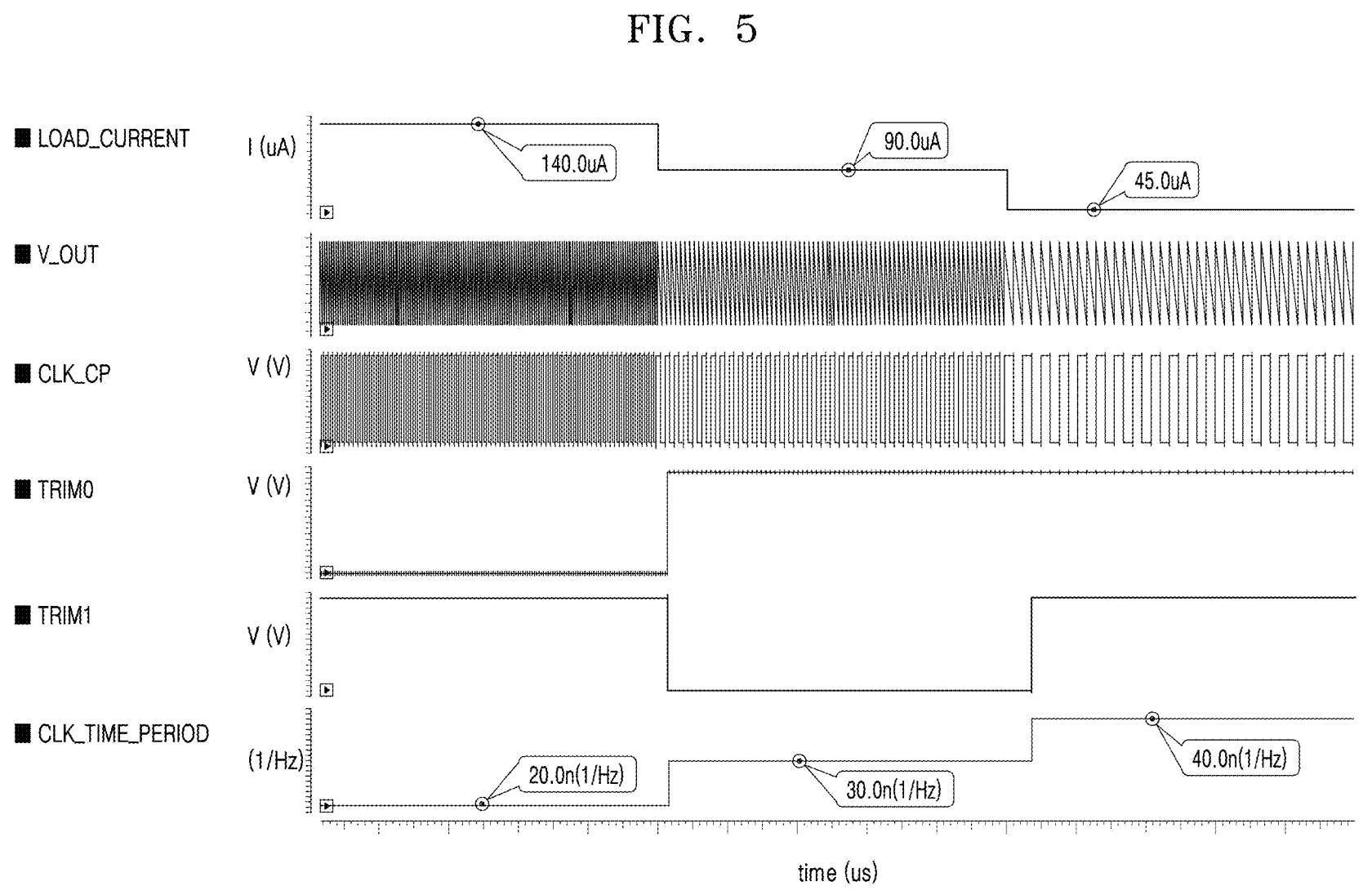

I (uA)   ■ LOAD_CURRENT 140.0uA     90.0uA     45.0uA

V (V)   ■ V_OUT

V (V)   ■ CLK_CP

V (V)   ■ TRIM0

V (V)   ■ TRIM1

(1/Hz)   ■ CLK_TIME_PERIOD 20.0n(1/Hz)     30.0n(1/Hz)     40.0n(1/Hz)

time (us)

CIRCUITS AND METHODS FOR CONTROLLING EFFICIENCY OF A CHARGE-PUMP REGULATION SYSTEM AT LOW-LOAD CURRENT

CROSS-REFERENCE TO RELATED APPLICATION

This application is based on and claims priority under 35 U.S.C. § 119 to Indian Patent Application number 202441075431, filed on Oct. 5, 2024 in the Indian Intellectual Property Office, the disclosure of which is incorporated by reference herein in its entirety.

TECHNICAL FIELD

Example embodiments disclosed herein relate to charge pump control systems, and, more particularly, to circuits and methods for Improving charge-pump-regulation-system current and power efficiencies at lower-load currents.

BACKGROUND

In general, a charge pump regulated system has a fixed component of power dissipation and a variable component of power dissipation depending on the load current variation. Due to the fixed component of power dissipation, current and power efficiencies at low load currents are very low. A dynamic or clocked comparator may be used to attain less comparison delay as compared to delay provided by a static comparator for the same amount of current burnt.

FIG. 1 depicts an existing control circuit (100) for controlling charge pump regulation. For regulating charge pump system, there are fixed power consumption components (120) such as a PSM (Pulse skip modulator) (108), a dynamic comparator (106). An oscillator (112) generates a fixed clock signal in the charge pump regulation unit, thus the time period for the clock signal is fixed. The clock signal is provided to a dynamic comparator. The dynamic comparator (106) consumes fixed power in the charge pump system in accordance with the fixed oscillation frequency of a clock pulse train (as generated by the oscillator). A higher clock frequency results in high power consumption in the fixed power consumption components, and a lower clock frequency results in low power consumption in the fixed power consumption components. However, due to generation of the clock pulse with a fixed oscillation frequency (fixed time period), power consumption by the fixed power consumption components is the same at low load current, wherein the low load current is a current demanded by a DC load.

FIG. 2 is a waveform representing the relationship between CLK signal and CLK_CP signal in the existing charge pump regulation unit. The pulse width has a very direct relation with these load currents. A higher load current results in a smaller pulse width, and a smaller load current results in a very large pulse width. The existing control circuit for regulating charge pump does not determine factors that affects the power consumption of the fixed power components and also does not change the power consumption of the fixed power components with respect to a variable load current. There is no specific method or circuit currently available to control the power consumption of the fixed power consumption components with respect to the load current. Currently, the problem with the existing control circuit for regulating charge pump is to improve the power efficiency of the existing control circuit for regulating charge-pump, which is only possible by decreasing the power consumption of the charge pump system specially, when the charge pump system is driving lower load currents. For example, when the charge pump is providing 100 μA current and consuming 200 μA current results in an inefficient system.

Hence, there is a need in the art for solutions that will overcome the above mentioned drawback(s), among others.

OBJECTS

Although specific objects of one or more example embodiments are set forth herein, it will be appreciated that any particular example embodiment may realize fewer than all of the listed objectives. In fact, some example embodiments may be used to realize different objectives. Consequently, the claims are not limited to the objectives listed herein, and even claimed example embodiments and/or implementations that may not realize the specifically listed objectives are contemplated as being encompassed by the present disclosure.

An object of various example embodiments disclosed herein is to provide control circuits and methods for controlling charge pump regulation.

Another object of various example embodiments disclosed herein is to provide control circuits and methods for controlling power consumption of at least one fixed power consumption component of a charge pump regulation unit.

Another object of various example embodiments disclosed herein is to provide control circuits for charge pump regulation using an adaptive frequency method in order to reduce power consumption of the at least one fixed power consumption component of the charge pump regulation unit.

Another object of example embodiments disclosed herein is to provide a charge pump control circuit and an adaptive frequency method for improving current and power efficiencies of the charge pump system at low load current.

Another object of example embodiments disclosed herein is to provide circuits for regulating a charge pump, wherein the circuits may sense the modulated width of at least one clock pulse train (which is provided/coupled to Charge-Pump unit) to control the frequency of the clock (which is being provided/coupled to at least one fixed power consumption unit) based on the low load current.

SUMMARY

Accordingly, example embodiments herein provide a clock-charge pump circuit to control a charge pump system, comprising a time-to-voltage converter, a comparator, an encoder and an oscillator. The time-to-voltage converter is configured to receive a charge pump clock signal, wherein the charge pump clock signal comprises load current information. The comparator is configured to compare one or more output voltages of the time-to-voltage converter to a reference voltage of the comparator. The encoder is configured to generate one or more oscillator control signals based on the status of an output signal received from the comparator. The oscillator is configured to tune one or more output clock signals, based on the one or more Oscillator control signals.

In some example embodiments, a method comprises generating a tuned clock signal by tuning an output of an oscillator using a control circuit including a time-to-voltage converter, a comparator circuit, and an encoder, providing the tuned clock signal to a dynamic comparator included in a charge pump regulator, and controlling a sampling rate of the dynamic comparator based on a frequency of the tuned clock signal.

Accordingly, example embodiments herein provide an adaptive frequency method to control a charge pump system. The adaptive frequency method discloses controlling, by a charge pump control circuit, a dynamic comparator using a charge pump clock. The dynamic comparator is controlled by tuning output of an oscillator using a time-to-voltage converter, at least one comparator and an encoder.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

The example embodiments disclosed herein are illustrated in the accompanying drawings, throughout which like reference letters indicate corresponding parts in the various figures. The example embodiments herein will be better understood from the following description with reference to the drawings, in which:

FIG. 5 shows time period of clock pulse generated from the oscillator is adjusting itself based on the trim0 and trim1 output from the encoder, according to example embodiments as disclosed herein;

DETAILED DESCRIPTION

Figure 1:
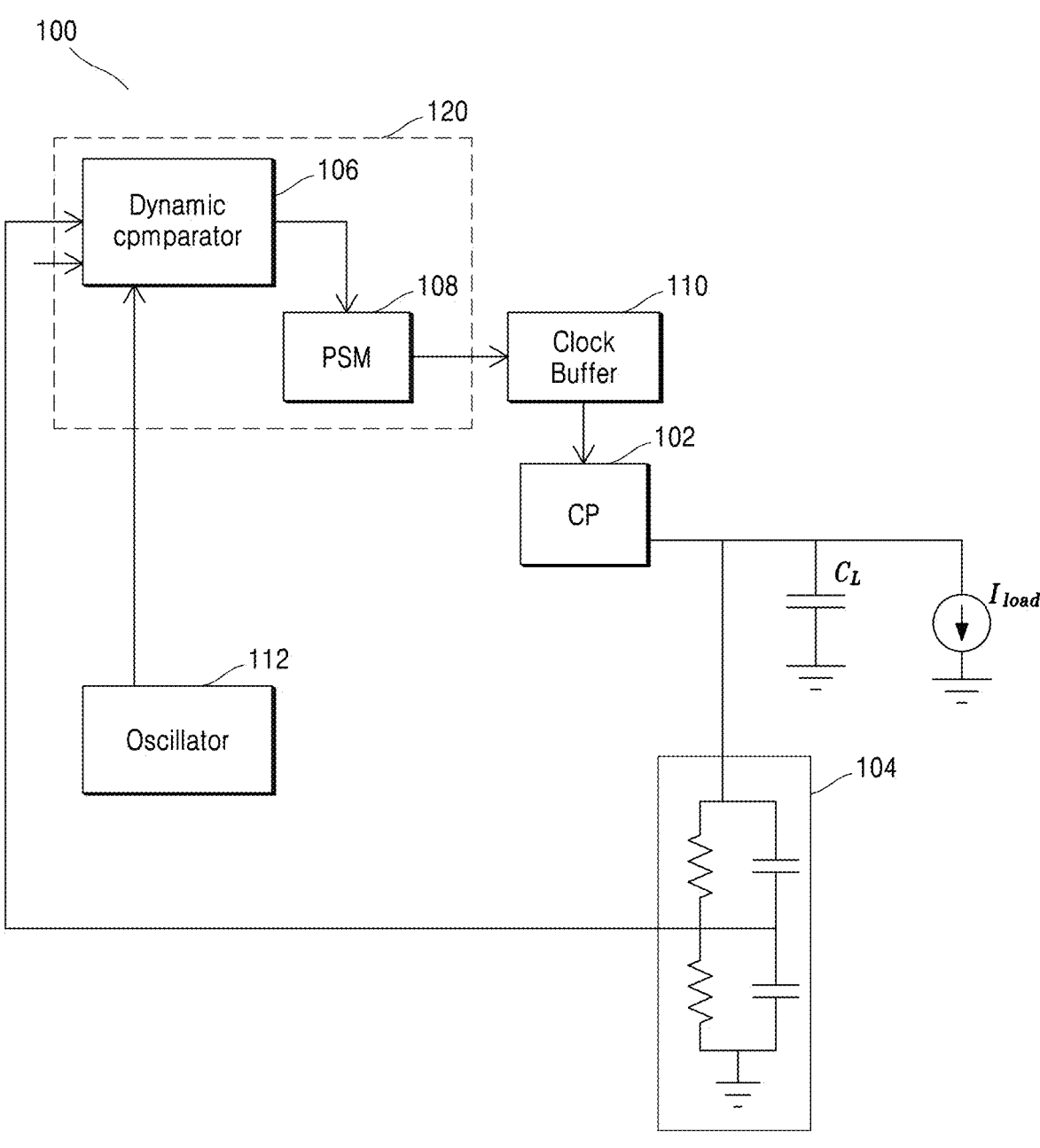
FIG. 1 depicts an existing control circuit (100) for controlling charge pump regulation.
Figure 2:
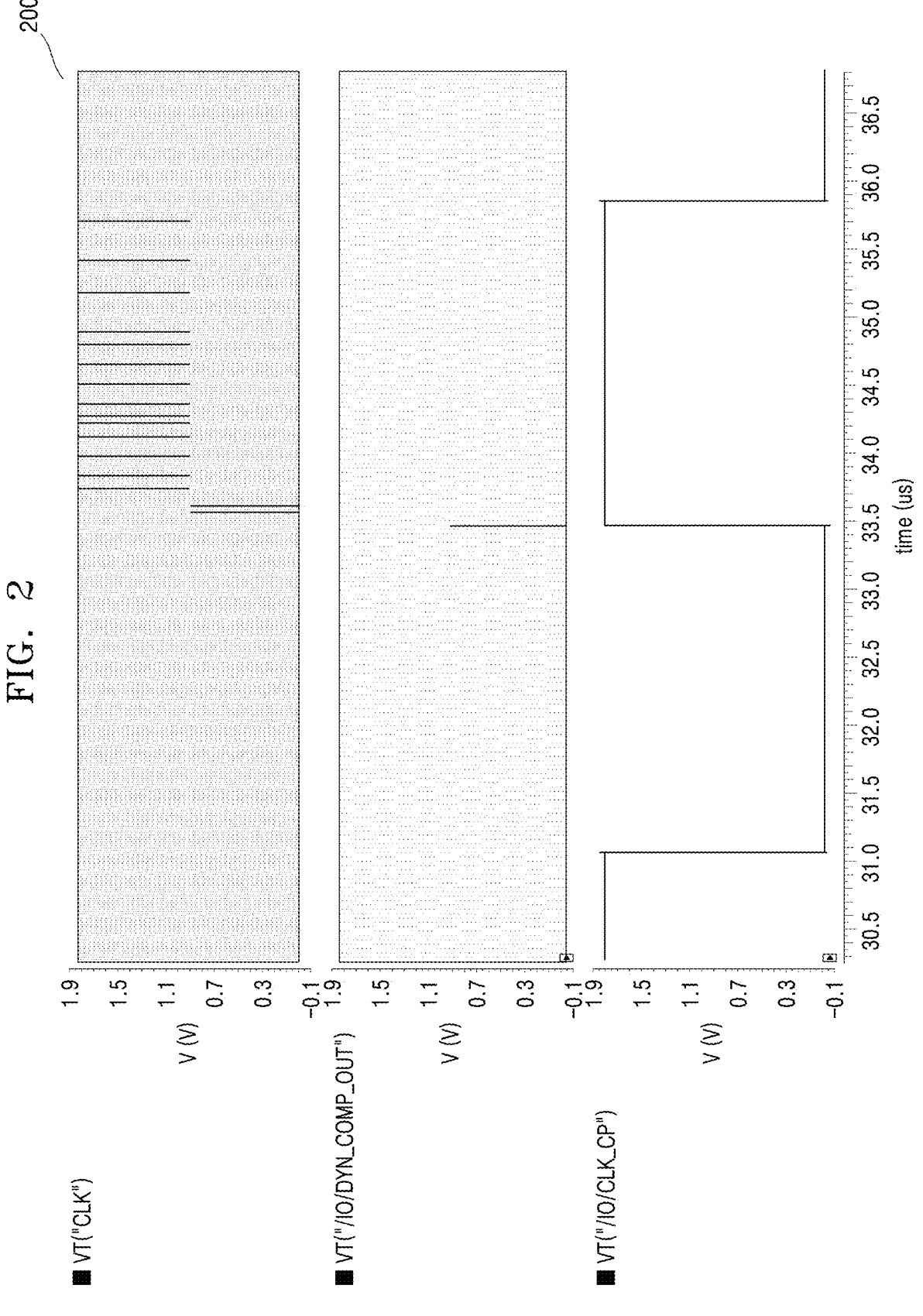
FIG. 2 depicts waveform representing relationship between CLK and CLK_CP signal for low load-current values in the existing charge pump regulation unit.

The example embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. The examples used herein are intended merely to facilitate an understanding of ways in which the example embodiments herein may be practiced and to further enable those of skill in the art to practice the example embodiments herein. Accordingly, the examples should not be construed as limiting the scope of the example embodiments herein.

For the purposes of interpreting this specification, the definitions (as defined herein) will apply and whenever appropriate the terms used in singular will also include the plural and vice versa. It is to be understood that the terminology used herein is for the purposes of describing particular example embodiments only and is not intended to be limiting. The terms "comprising", "having" and "including" are to be construed as open-ended terms unless otherwise noted.

The words/phrases "exemplary", "example", "illustration", "in an instance", "and the like", "and so on", "etc.", "etcetera", "e.g.,", "i.e.," are merely used herein to mean "serving as an example, instance, or illustration." Any example embodiment or implementation of the present subject matter described herein using the words/phrases "exemplary", "example", "illustration", "in an instance", "and the like", "and so on", "etc.", "etcetera", "e.g.,", "i.e.," is not necessarily to be construed as preferred or advantageous over other example embodiments.

Example embodiments herein may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the disclosure. Likewise, the blocks of the example embodiments may be physically combined into more complex blocks without departing from the scope of the disclosure.

It should be noted that elements in the drawings are illustrated for the purposes of this description and ease of understanding and may not have necessarily been drawn to scale. For example, the flowcharts/sequence diagrams illustrate the method in terms of the steps required for understanding of aspects of the example embodiments as disclosed herein. Furthermore, in terms of the construction of the device, one or more components of the device may have been represented in the drawings by conventional symbols, and the drawings may show only those specific details that are pertinent to understanding the present example embodiments so as not to obscure the drawings with details that will be readily apparent to those of ordinary skill in the art having the benefit of the description herein. Furthermore, in terms of the system, one or more components/modules which comprise the system may have been represented in the drawings by conventional symbols, and the drawings may show only those specific details that are pertinent to understanding the present example embodiments so as not to obscure the drawings with details that will be readily apparent to those of ordinary skill in the art having the benefit of the description herein.

The accompanying drawings are used to help easily understand various technical features and it should be understood that the example embodiments presented herein are not limited by the accompanying drawings. As such, the present disclosure should be construed to extend to any modifications, equivalents, and substitutes in addition to those which are particularly set out in the accompanying drawings and the corresponding description. Usage of words such as first, second, third etc., to describe components/ elements/steps is for the purposes of this description and should not be construed as sequential ordering/placement/ occurrence unless specified otherwise.

The example embodiments herein achieve a control circuits and methods for controlling charge pump regulation at low load currents. Referring now to the drawings, and more particularly to FIGS. 3 through 7, where similar reference characters denote corresponding features consistently throughout the figures, there are shown example embodiments.

Figure 3:
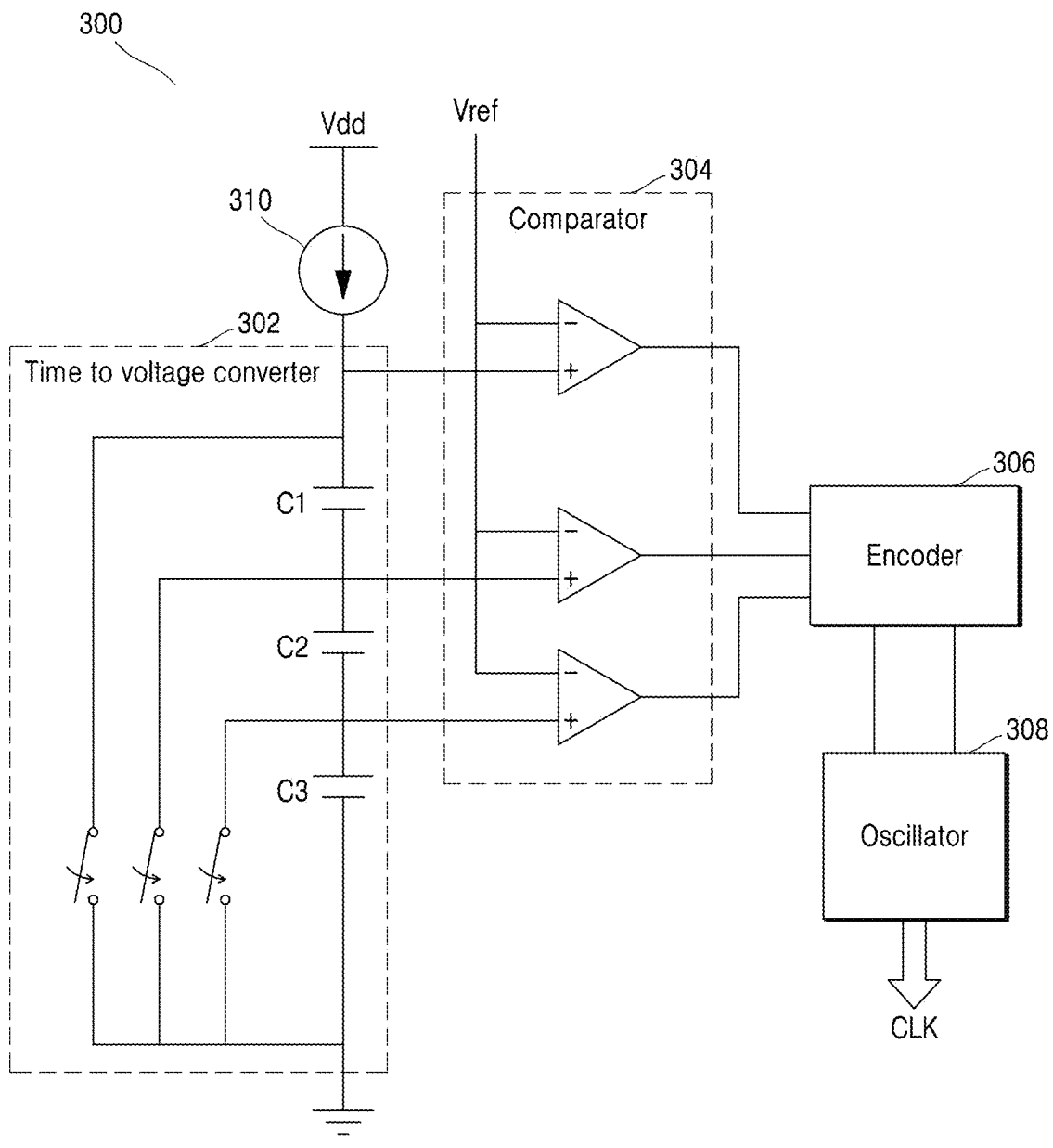
FIG. 3 represents a control circuit (300) for controlling charge pump regulation by improving power efficiency of a charge pump (102) at low load currents, according to example embodiments as disclosed herein.

FIG. 3 represents a control circuit (300) for controlling charge pump regulation by improving power efficiency of a charge pump (102) at low load currents, according to various example embodiments as disclosed herein. The control circuit (300) comprises a time-to-voltage converter (302), a comparator (304), an encoder (306), and an oscillator (308). The comparator (304) is be connected to the time-to-voltage converter (302) to receive output from the time-to-voltage converter. The encoder (306) is be connected to the comparator (304) to receive output from the comparator (304). The oscillator (308) is connected to the encoder (306) to receive output from the encoder (306).

The time-to-voltage converter (302) may convert a time interval of one or more time stamping events to one or more equivalent voltages. In an example embodiment herein, the time-to-voltage converter (302) converts the time interval between a rising edge of a clock pulse) and a trailing edge of a clock pulse) as measured to one or more equivalent voltages. In an example embodiment herein, the time-to-voltage converter includes a first capacitor (C1), a second capacitor (C2), and a third capacitor (C3) connected in series with each other. The capacitors C1, C2, and C3 are driven by a current source (310), wherein capacitance value of the capacitors C1, C2, and C3 may be C. The capacitors C1, C2, and C3 may store charge for different ranges of load currents, wherein the load current is measured across a load connected at the output end of the charge pump (102). The clock pulse as coupled/provided to the time-to-voltage converter includes load current information of the charge pump (102). A clock pulse with a very large pulse width corresponds to a low load current, and a clock pulse with a very small pulse width corresponds to a high load currents. In an example embodiment herein, the capacitors C1, C2, and C3 may be charged by the current source (310) for a length of time corresponding to a clock pulse. The three capacitors receive the clock pulse as input, wherein the clock pulse includes a load current information. Note that in at least one example embodiment, the pulse width and or frequency of a clock pulse corresponds to an output load current level, and is said to include load current information. In an example embodiment herein, the time-to-voltage converter may receive four different clock pulses including four different ranges of load current information. The capacitors C1, C2, and C3 of the time-to-voltage converter are discharged with the rising edge of the clock pulse.

In an example embodiment herein, the clock pulse (CLK_Cp) to the time-to-voltage converter (302) may be a switch. When the switch is closed, CLK_Cp is high (i.e. peak of the CLK_Cp) and the capacitor discharges a stored charge. Further, in an example embodiment herein, when the switch (CLK_Cp) is low, the capacitor may charge with the current source. In an example embodiment herein, each capacitor of the capacitors C1, C2, and C3 are discharged when he CLK_CP is low. Further, pulse width of the clock pulses represents load current information. For a wider pulse width, load current is low and for a narrow pulse width, load current is high. Further, total charge delivered to each capacitor of the capacitors C1, C2, and C3 may be an analog representation of a pulse width of the clock pulse. In an example embodiment herein, the time-to-voltage converter (302) may output three different voltages for four different ranges of load current for each of the capacitors C1, C2, and C3. Further, with respect to various example embodiments of the present disclosure, the time-to-voltage converter (302) may comprise more than three capacitors C1, C2, and C3 for more than four ranges of load current.

Figure 4:
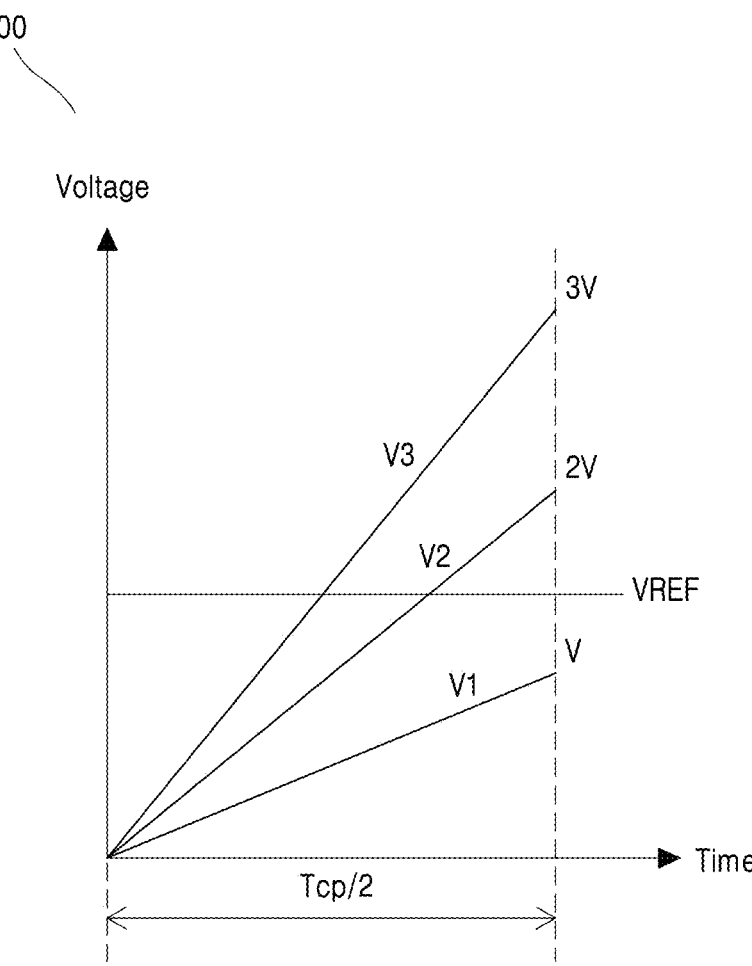
FIG. 4 depicts a graphical presentation of time and voltage provides information on elapsed time for attaining the reference voltage by the at least one capacitor of the time-to-voltage converter, according to example embodiments as disclosed herein.

The comparator (304) compares an output voltage from the time-to-voltage converter (302) with a reference voltage. The reference voltage may be a value between 0 and a voltage equivalent to a supply voltage (Vad) to the time-to-voltage converter (302). The reference voltage may be pre-set by a user based on the load current, rampcapacitor (i.e C1, C2, C3 of the time-to-voltage converter), capacitor current (of the time-to-voltage converter capacitor) and time taken for charging of the ramp capacitor. In an example embodiment herein, the comparator (304) may comprise a first comparator, a second comparator, and a third comparator for comparing the output voltages from the first capacitor (C1), the second capacitor (C2), and the third capacitor (C3) respectively with the reference voltage. The comparator (304) compares the output voltage received from the time-to-voltage converter (302) with the reference voltage. The comparator (304) may output at least one compared voltage including information of high and/or low voltage state of the time-to-voltage converter with respect to the reference voltage. Based on the comparison result from the comparator, the information on load current is obtained. A graphical presentation (as shown in FIG. 4) of time and voltage provides information on elapsed time for attaining the reference voltage by the at least one capacitor of the time-to-voltage converter. From FIG. 4, it is observed that the two voltage-labelled straight lines representing $V_3$ and $V_2$ are intersecting with a time-labelled intersecting-line parallel to y-axis. The time-labelled intersecting line represents a demarcation time for marking output from the comparator as high and/or low. $V_3$ and $V_2$ are marked as high voltage output, wherein V; is marked as a low voltage output, and the voltage labelled straight line $V_1$ is below the reference voltage label.

Figure 7:
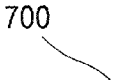
FIG. 7 depicts demarcation for different time period of clock pulses at different range of load currents, according to example embodiments as disclosed herein.
Figure 7:
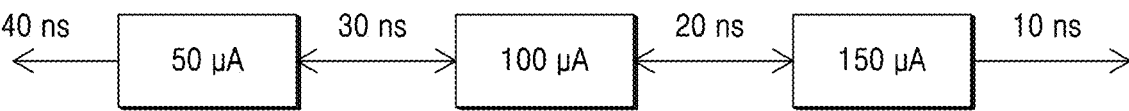

In an example embodiment herein, demarcation for different time period of clock pulses at the four different ranges of load current is shown in FIG. 7. For a load current of range 0-50 µA, time period for clock pulse is 40 ns, for a load current of range 50-100 µA, time period for clock pulse is 30 ns, for a load current of range 100-150 µA, time period for clock pulse is 20 ns, For a load current of range 0-50 µA, time period for clock pulse is 40 ns.

Value of Ramp capacitor and value of source current in time-to-voltage converter may be obtained from, $$V_{REF} = \left(\frac{I_{CAP}}{C_{RAMP}}\right) \times t,$$

$$\text{Therefore, } t = \left(\frac{C_{RAMP}}{I_{CAP}}\right) \times V_{REF},$$

$$\text{For Ramp voltage to cross } V_{REF} \text{ for } t < \frac{T_{CP}}{2},$$

$$\frac{T_{cp}}{2} > \left(\frac{C_{RAMP}}{I_{CAP}}\right) \times V_{REF}$$

$T_{CP}$ can be expressed in terms of $I_{load}$ and $V_{out}$ as $V_{out}$ $$= (N+1)V_{dd} - N\frac{I_{load}T_{cp}}{2C_{STG}}$$

$$\text{Therefore, } \frac{C_{STG}}{N\,I_{load}}[(N+1)V_{dd} - V_{out}] > \left(\frac{C_{RAMP}}{I_{CAP}}\right) \times V_{REF}$$

$$\frac{C_{RAMP}}{I_{CAP}} < \frac{C_{STG}}{NV_{REF}I_{load}}[(N+1)V_{dd} - V_{out}],$$

Wherein, $I_{CAP}$=current source connected to the time-to-voltage converter, $C_{RAMP}$=ramp capacitor in time-to-voltage convert, t=time taken for the capacitor to attain VREF, $T_{cp}$=time period of charge-pump clock $C_{STG}$=equivalent stage capacitance of the 2 stage pelloconi charge pump, $V_{dd}$=input voltage to the two stage Pelliconi charge pump, $V_{out}$=output voltage from the Pelliconi charge pump, N=2=total number of stages in the charge pump, $I_{load}$=static load current of the charge-pump The encoder (306) receives output from the comparator (304). In an example embodiment herein, the encoder (306) may provide a high trim1 output and a low trim0 output upon receiving three encoder inputs as outputted by the comparator, wherein the three encoder inputs include information on state of voltage (high/low) and each encoder input is presented in at least one bit. Output from the encoder (306) is coupled to an input to the oscillator. In an example embodiment, the encoder providing the trim0 and the trim1 output may comprise a plurality of OR gates performing logical operation upon receiving a plurality of inputs from the comparator. Further, with respect to various example embodiments herein, the input to the encoder may be more than three encoder inputs as received from the comparator and the output from the encoder may be more than two outputs of trim0 and trim1.

The oscillator (308) receives output from the encoder (306). In an example embodiment herein the oscillator may be, without limitation, a "Ring oscillator" or a "Relaxation oscillator". Further, in an example embodiment herein, a Verilog-A model of an oscillator is used in the control circuit for a charge pump regulation system at low load currents. In an embodiment herein, the Verilog-A model of oscillator is a digitally programmable oscillator, wherein frequency of the digitally programmable oscillator is controlled by output of the encoder (306). In some example embodiments, the outputs (trim0 and trim1) from the encoder may have voltage level used for trimming/adjusting the oscillation frequency with respect to the desired output from the oscillator, wherein the desired output aids in reducing power consumption by the fixed power consumption-components of the charge pump regulation circuit at low load current. In an example embodiment herein, at low load currents, the oscillator may produce a clock pulse of a higher time period in order to reduce power consumption of the fixed power consumption components. Further, in an example embodiment herein, at high load currents, the oscillator may produce a clock pulse of a lower time period and enabling at least one fixed power consumption component of a charge pump regulation unit to consume adequate power for functioning a charge pump. In an example embodiment herein, when the output from the comparator (304) is high, the oscillator (308) may change bit patterns, thereby changing time period of clock pulse. FIG. 5 shows a graphical representation of time period of clock pulse generated from the oscillator is adjusting itself based on the trim0 and trim1 output from the encoder and the encoder.

Figure 6:
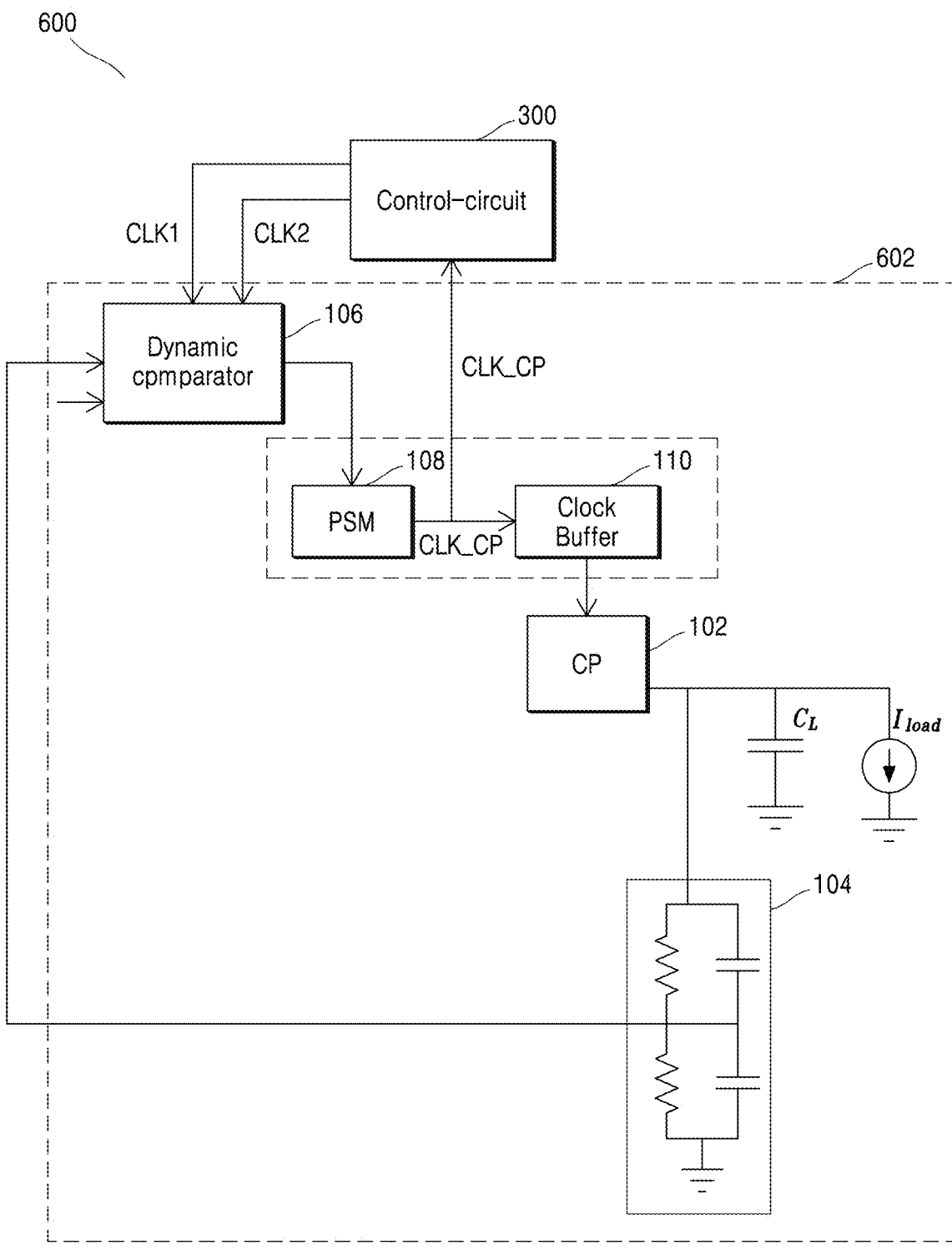
FIG. 6 depicts a charge pump regulation unit (602) connected with the control circuit (300), in order to improve efficiency of a charge pump at low load current, according to example embodiments as disclosed herein.

FIG. 6 depicts a charge pump regulation unit (602) connected with the control circuit (300), in order to improve efficiency of a charge pump at low load current. The charge pump regulation unit (602) comprises a core charge pump (102), a resistive divider (104), a control circuit (300), a dynamic comparator (106), a pulse skip modulator (PSM) (108), a clock buffer (110) and a capacitive load (CL) (602).

In an example embodiment herein, the charge pump (102) may be a Pelliconi charge pump having improved voltage gain. In an example embodiment, a two stage Pelliconi charge pump in cascaded configuration may be used. The cascaded configuration of the two stage Pelliconi charge pump may include two switching stages, wherein each switching stage may use a CMOS topology. The Pelliconi charge pump may be operated using the input voltage ($V_{dd}$) (not shown) and the clock signals delivered to the Pelliconi charge pump may be by the clock buffer (110), wherein the clock buffer (110) may drive on a plurality of stage-capacitors of the Pelliconi charge pump. Output from the Pelliconi charge pump may be provided to the resistive divider (104), wherein output from the resistive divider (104) is provided as feedback to the dynamic comparator (106) of the charge pump regulation unit (602).

The dynamic comparator (106) is receiving the output from the resistive divider (104), thus an output from the charge pump is provided as feedback to the dynamic comparator (106) in order to regulate the function of the charge pump (102) by controlling charge pump clock. The dynamic comparator (106) compares the voltage (as received from the resistive divider) with a pre-set reference voltage of the dynamic comparator. Primarily, the reference voltage is selected to minimize delay in a feedback loop of the charge pump regulation system. If the feedback voltage to the dynamic comparator is larger than the reference voltage, the output of the dynamic comparator goes high. The output of the dynamic comparator is provided as an input to the PSM (108).

In an example embodiment herein, the PSM (108) may remove one or more pulses from a modulated pulse train (Pulse width modulated pulse train) for controlling effective voltage gain of the charge pump by controlling capacity of the charge pump. Further, the output of the PSM (108) is provided to an input to the clock buffer which is controlling the consumption of power by the charge pump. Further, the capacitive load (CL) (602) is connected parallel to the output of the core charge pump, wherein a load current range of DC current load due to output from the core charge pump, is measured.

Comparison tables (Table 1 and Table 2) are presented below, for comparing the charge pump old regulation and charge pump new regulation, at 40 µA load current.

TABLE 1

| | Block | $I_{AVG}$ with old Regulation | $I_{AVG}$ with new Regulation |
|---|---|---|---|
| CP unit | Clock driver | 98 μA | 98 μA |
| | Charge pump input current | 47 μA | 47 μA |
| CP regulation block | Dynamic comparator | 51 μA | 13 μA |
| | ON-OFF modulator 1 | 5 μA | 1 μA |
| | Resistive ladder | 6 μA | 6 μA |
| New Blocks | Comparator block | — | 8 μA |
| | Encoder | — | 0.2 μA |
| | Time-to-voltage converter | — | 1 μA |
| Total | | 207 μA | 174 μA |

TABLE 2

| | Old | New | Improvement |
|---|---|---|---|
| Current Efficiency | 19% | 23.3% | 19% |
| Power Efficiency | 35% | 42.2% | 20% |

The example embodiments disclosed herein may be implemented through at least one software program running on at least one hardware device and performing network management functions to control the network elements. The network elements shown in FIG. 3 include blocks which may be at least one of a hardware device, or a combination of hardware device and software module.

The example embodiment disclosed herein describes a control circuit and a method to control charge pump regulation. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one example embodiment through or together with a software program written in e.g., Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method example embodiments described herein could be implemented partly in hardware and partly in software. Alternatively, the invention may be implemented on different hardware devices, e.g., using a plurality of CPUs.

The foregoing description of the specific example embodiments will so fully reveal the general nature of the example embodiments herein that others may, by applying current knowledge, readily modify and/or adapt for various applications such specific example embodiments without departing from the generic concept, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of example embodiments and examples, those skilled in the art will recognize that the example embodiments and examples disclosed herein may be practiced with modification within the scope of the example embodiments as described herein.

As used herein, expressions such as "at least one of," when preceding a list of elements, modify the entire list of elements and do not modify the individual elements of the list. Thus, for example, both "at least one of A, B, or C" and "at least one of A, B, and C" mean either A, B, C or any combination of two or more of A, B, and C. Likewise, A and/or B means A, B, or A and B.

In various example embodiments herein, reference may have been made to various circuit elements, including but not limited to capacitors, resistor, inductors, switches, amplifiers, comparators, filters, and transistors. Various different types of digital, analog, active and/or passive components are available for use in implementing the example embodiments. For example, as discussed above, pseudo-resistors can be substituted for passive resistors. Additionally various different transistor types can be used depending on the implementation, whether positive or negative logic is used, manufacturing processes employed, or the like. Furthermore, unless specifically stated otherwise herein, there are many available types of filters, comparators, switches, and the like that can be used to implement the example embodiments.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

We claim:

1. A charge pump control circuit, comprising:
   a time-to-voltage converter configured to receive a charge pump clock signal, wherein the charge pump clock signal comprises a load current information;
   a comparator circuit configured to compare one or more output voltages of the time-to-voltage converter to a reference voltage of the comparator circuit;
   an encoder configured to generate one or more oscillator control signals based on a status of output signals received from the comparator circuit; and
   an oscillator configured to tune one or more output clock signals based on the one or more oscillator control signals.

2. The charge pump control circuit as claimed in claim 1, wherein
   the time-to-voltage converter comprises a first capacitor, a second capacitor, and a third capacitor driven by a current source,
   the comparator circuit comprises a first comparator, a second comparator, and a third comparator,
   the first capacitor, is configured to provide a first output voltage corresponding to a charge time of the first capacitor, determined in part by the charge pump clock signal, from a first terminal of the time-to-voltage converter to the first comparator, the second capacitor is configured to provide a second output voltage corresponding to a charge time of the second capacitor, determined in part by the charge pump clock signal, from a second terminal of the time-to-voltage converter to the second comparator, and the third capacitor is configured to provide a third output voltage of a third terminal corresponding to a charge time of the third capacitor, determined in part by the charge pump clock signal, from the time-to-voltage converter to the third comparator respectively.

3. The charge pump control circuit as claimed in claim 2, wherein an output signal of the first comparator is configured to be in a logical high state in response to the first output voltage of the first terminal of the time-to-voltage converter reaching a reference voltage level of the comparator circuit, an output signal of the second comparator is configured to be in a logical high state in response to the second output voltage of the second terminal of the time-to-voltage converter reaching the reference voltage level of the comparator circuit, and an output signal of the third comparator is configured to be in a logical high state in response to the third output voltage of the third terminal of the time-to-voltage converter reaching the reference voltage level of the comparator circuit.

4. The charge pump control circuit as claimed in claim 3, wherein the output signal of the first comparator, the output signal of the second comparator, and the output signal of the third comparator are coupled to a first input terminal, a second input terminal, and a third input terminal of the encoder, respectively.

5. The charge pump control circuit as claimed in claim 1, wherein the oscillator is further configured to:

tune the one or more output clock signals by changing a frequency of a clock signal of the oscillator, based on the one or more oscillator control signals, to generate one or more tuned output clock signals; and control a clock of a dynamic comparator using the one or more tuned output clock signals.

6. A method comprising:

generating a tuned clock signal by tuning an output of an oscillator using a control circuit including a time-to-voltage converter, a comparator circuit, and an encoder;

providing the tuned clock signal to a dynamic comparator included in a charge pump regulator; and controlling a sampling rate of the dynamic comparator based on a frequency of the tuned clock signal.

7. The method of claim 6, wherein generating the tuned clock signal includes:

providing a charge pump clock signal to an input of the time-to-voltage converter.

8. The method of claim 7, wherein generating the tuned clock signal includes:

charging a plurality of capacitors coupled in series for a charging time determined by the charge pump clock signal.

9. The method of claim 8, wherein generating the tuned clock signal includes generating a plurality of outputs using the comparator circuit, wherein a value of the plurality of outputs is determined by comparing a charge developed across each of the plurality of capacitors during the charging time to a reference voltage.

10. The method of claim 9, wherein generating the tuned clock signal includes encoding the plurality of outputs into encoded outputs, using the encoder.

11. The method of claim 10, wherein generating the tuned clock signal includes tuning the output of the oscillator based on the encoded outputs.

* * * * *